(12) United States Patent
Raeber et al.

(10) Patent No.: US 7,623,415 B2
(45) Date of Patent: Nov. 24, 2009

(54) ELECTRONIC DEVICE WITH ANALOGUE DISPLAY OF THE HISTORY OF AT LEAST ONE QUANTITY MEASURED BY A SENSOR

(75) Inventors: Guy Raeber, Chardonne (CH); Frank Kräuchi, Yverdon (CH); Beat Gilomen, Grenchen (CH); Vincent Berseth, Neuchâtel (CH); Jean-Jacques Born, Morges (CH); Christophe Germiquet, Prêles (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 0 days.

(21) Appl. No.: 10/598,550

(22) PCT Filed: Mar. 2, 2005

(86) PCT No.: PCT/EP2005/002165

§ 371 (c)(1),
(2), (4) Date: Sep. 5, 2006

(87) PCT Pub. No.: WO2005/096105

PCT Pub. Date: Oct. 13, 2005

(65) Prior Publication Data

US 2007/0183264 A1    Aug. 9, 2007

(30) Foreign Application Priority Data

Mar. 3, 2004    (EP) .................................. 04100859

(51) Int. Cl.
*G04B 47/06*    (2006.01)

(52) U.S. Cl. .............................. 368/11; 368/10; 368/80

(58) Field of Classification Search .................... 368/11, 368/10, 80; 73/291, 301, 293, 323, 325
See application file for complete search history.

(56) References Cited

U.S. PATENT DOCUMENTS

| 4,783,772 | A | 11/1988 | Umemoto et al. | |
| 6,463,011 | B1 * | 10/2002 | Christen et al. | ............... 368/69 |
| 6,490,230 | B1 * | 12/2002 | Sakuyama et al. | ............ 368/11 |

(Continued)

FOREIGN PATENT DOCUMENTS

EP    1 008 512 A1    6/2000

(Continued)

OTHER PUBLICATIONS

International Search Report issued in corresponding application No. PCT/EP2005/002165 completed Jul. 22, 2005 and mailed Aug. 1, 2005.

*Primary Examiner*—Vit W Miska
*Assistant Examiner*—Sean Kayes
(74) *Attorney, Agent, or Firm*—Griffin & Szipl, P.C.

(57) ABSTRACT

There is disclosed a portable electronic device (1), particularly of the wristwatch type, comprising at least first and second analogue display members, a sensor (23, 52) powered to take measurements of a surrounding physical magnitude and a memory zone (26) for storing the measured physical magnitude values. The electronic circuits of the device are capable of operating the analogue display members, in an operating mode called the historic mode, such that at least one of them indicates the change in the stored value as a function of time opposite suitable graduations (8, 9, 33, 42, 51) of the device.

2 Claims, 6 Drawing Sheets

U.S. PATENT DOCUMENTS

| | | | |
|---|---|---|---|
| 6,754,137 B1 * | 6/2004 | Bourquin et al. | 368/11 |
| 6,842,403 B2 * | 1/2005 | Meis | 368/110 |
| 7,031,226 B2 * | 4/2006 | Farine | 368/10 |
| 7,113,450 B2 * | 9/2006 | Plancon et al. | 368/10 |
| 7,154,817 B2 * | 12/2006 | Born et al. | 368/80 |
| 2004/0047242 A1 * | 3/2004 | Germiquet et al. | 368/11 |

FOREIGN PATENT DOCUMENTS

| | | |
|---|---|---|
| EP | 1 396 766 A1 | 3/2004 |
| EP | 1 396 767 A1 | 3/2004 |

* cited by examiner

ELECTRONIC DEVICE WITH ANALOGUE DISPLAY OF THE HISTORY OF AT LEAST ONE QUANTITY MEASURED BY A SENSOR

This is a National Phase Application in the United States of International Patent Application No. PCT/EP 2005/002165 filed Mar. 2, 2005, which claims priority on European Patent Application No. 04100859.0, filed 03.03.2004. The entire disclosures of the above patent applications are hereby incorporated by reference.

FIELD OF THE INVENTION

The present invention concerns an electronic device including a case preferably containing a watch movement on which a dial is mounted, the watch movement including electronic circuits capable of generating time signals to be sent to motor means controlling at least two analogue display members. The analogue display members are arranged above the dial to display the current time in a first operating mode, called the time mode, the device further including storage means, a sensor for a physical magnitude and processing means for acquiring and storing the value of the development of the physical magnitude over time in a second operating mode of the device.

More specifically, the present invention concerns in particular a watch having an analogue type display and comprising a sensor for taking measurements of a physical magnitude such as pressure or temperature. The measurements taken by the sensor can thus be used to inform the person wearing the watch of certain conditions linked to his environment, as may prove necessary when playing sport, for example.

The present invention also concerns a method for displaying a history implemented in a device of the aforementioned type.

Referring to EP Patent Application No. 02078630.7, filed on 4 Sep. 2002 in the name of Asulab S. A, and entitled "Montre électronique de plongée à affichage analogique", the Applicant, on his own initiative, has limited the scope of the claims so as to exclude one particular of the embodiment of the device for carrying out dives and according to which, in one particular operating mode, a first display member displays information relating to the time remaining before a decompression stop has to be made whereas the second display member display depth-related information.

BACKGROUND OF THE INVENTION

Watches or portable electronic devices of this type are known from the prior art, with the difference that, generally, the latter are provided with a digital type display. By way of example, one could mention the numerous dive watches or computers available on the market and having a digital display of depth and other information. Likewise, one could mention the numerous watches available on the market having an altimeter function, whose display is typically digital.

A relatively high proportion of these products have a storage function for the measurements taken using the sensor, with the possibility of subsequently editing the stored values.

However, the user of these portable electronic devices is generally allowed to access the stored values via a personal computer into which the values have previously been transferred. Indeed, the user cannot directly use the digital display of the stored values on the portable device. Moreover, a graphic type display cannot be easily realized because of the dimensions necessary to make the latter legible, such dimensions being incompatible with conventional requirements, in terms of space requirement, in the manufacture of such portable electronic devices.

SUMMARY OF THE INVENTION

It is a first object of the invention to overcome the aforementioned drawbacks of the prior art by providing a portable electronic device for displaying the results of measurements taken beforehand using a sensor.

It is another object of the invention to propose a portable electronic device whose display is intuitive and allows the user to access certain information other than the time in a fast and easy to read way.

Therefore, the invention provides a portable electronic device of the aforementioned type, characterized in that it has a third operating mode, called the historic mode, which provides a display of the development of the physical magnitude over time. Thus, at least a first of the analogue display members is able to indicate the value of a variable whose development is connected to that of the physical magnitude opposite suitable graduations of the device.

It should be noted that the present invention concerns a device of this type, on condition that, if the sensor is a pressure sensor, the variable does not give an indication of the time remaining before a decompression stop is necessary, this magnitude being used for underwater diving, when the second of the analogue display members is operated to indicate depth related information.

The present invention also concerns a method of displaying a historical account on a device of the aforementioned type.

Depending upon the nature of the measurements taken, the historic mode according to the present invention is not only of ludic interest but can also be advantageous from the point of view of the safety of the person wearing the device.

Indeed, according to a particular embodiment, the electronic device could include a pressure sensor for displaying the altitude of its wearer. In such case, the altitude value could be stored as a function of time, like for example during a mountain hike. Thus, the person wearing the device can see the profile of the hike that he has just taken as soon as it is finished, directly on the device. According to a preferred embodiment of the invention, the device includes hands for indicating the time, at least one of these hands also being used to indicate the change in altitude over time in the historic mode. Thus, the user can read the profile of the hike intuitively and easily. Of course, the second hand could remain still in the historic mode, or alternatively that it remains superposed to the first hand, even move regularly opposite the dial to indicate the passing of time.

According to another particular embodiment also implementing a pressure sensor, the device can be made in the form of a dive watch. In such case, in the historic mode, a hand could be used to indicate the value and change of depth over time for a prior dive, whereas the second hand could indicate the time elapsed since the start of the dive, at a given moment. The advantage of the device according to this embodiment extends beyond the purely ludic aspect. Indeed, the historic mode is of major interest as regards safety, since it displays the profile of the last dive in the event of an accident.

Of course, the device according to the present invention is not limited to the use of a pressure sensor. The historic mode can advantageously be implemented in relation to measurements taken by a temperature sensor or even with a magnetic field sensor, for example.

Moreover, a certain number of alternative embodiments can be provided, such as a specific display of measured values as they are acquired, adaptation of the display scales in the historic mode as a function of the measured extremums, automatic or manual activation of the acquisition mode, a plurality of memory zones each of which is dedicated to a series of particular measurements, or the arrangement of at least one liquid crystal display screen on the dial to complete the analogue display.

BRIEF DESCRIPTION OF THE DRAWINGS

Other features and advantages of the present invention will appear more clearly upon reading the following detailed description, made with reference to the annexed drawings, in which.

DETAILED DESCRIPTION OF THE INVENTION

Figure 1:
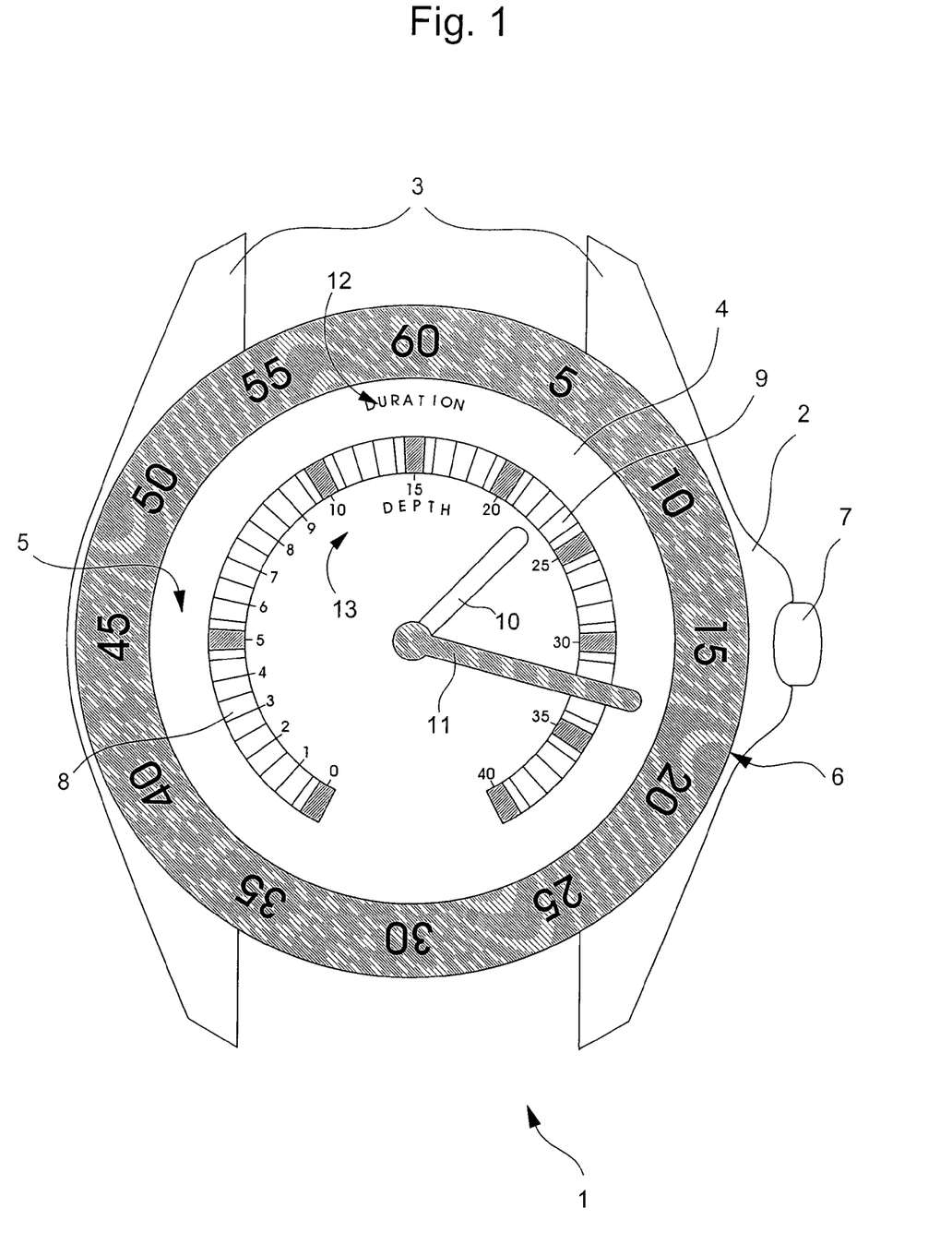
FIG. 1 shows a front view of a portable electronic device according to a first embodiment of the present invention.

FIG. 1 shows a first preferred embodiment of the portable electronic device according to the present invention, in the form of a dive watch that is very simple both from the structural point of view and from the operating point of view. Watch 1 has the appearance of a conventional type of watch. It comprises a case 2 able, for example, to be of the type having a moulded plastic back cover-middle part, including horns 3 provided for attachment to a wristband or bracelet (not shown) and containing in particular a watch movement (not shown), and a dial 4, and closed on its top surface by a crystal 5, bearing a fixed bezel 6 on its periphery. Watch 1 further includes a single control member 7, namely a stem-crown, able to be used in particular as a push-button in addition to its conventional use in rotation.

Bezel 6 bears first minute graduations extending from a first 5 minute indication to a last 60 minute indication, with a 5 minute space between two successive graduations.

Dial 4 carries second circular graduations, whose unit is the metre, subdivided into two zones. The first zone 8 extends, in the clockwise direction, from the position of the 35 minute graduation to the position of the 55 minute graduation. The second zone 9 extends, in the clockwise direction, from the end of first zone 8 to the position of the 25 minute graduation. The first and second zones 8 and 9 have different respective colours, the graduation pitch of first zone 8 being two times greater than the graduation pitch of second zone 9.

Watch 1 also includes two hands, respectively, hour hand 10 and minute hand 11. It should also be noted that minute hand 11 has the same colour as fixed bezel 6.

Dial 4 carries addition indications, given by way of example here, in particular the word "durde" (duration) 12 arranged in the periphery of the dial, and the expression "profondeur" (depth) 13 arranged directly inside the second graduations. These addition indications 12 and 13 are thus virtually the only visible indices of the watch of the invention capable of suggesting to the observer that the latter has additional functions compared to a conventional watch.

In fact, watch 1 includes particular technical means, which will be described briefly hereinafter in relation to FIG. 2, allowing it to provide specific indications relating to diving. These technical means include in particular a pressure sensor for measuring at each instant the pressure of the environment outside the watch and converting the pressure into depth in the context of diving. These techniques have been described in numerous documents of the prior art and will not be addressed in more detail hereinafter.

Thus, by suitable programming of the electronic circuit of the watch according to the present invention, a first operating mode, or time mode is provided, wherein the conventional functions are performed by the hour and minute hands. Moreover, stem-crown 7 has two stable positions and one unstable position, a first stable position being the rest position wherein the stem-crown does not perform any function. In a conventional manner, the second stable position is a pulled-out position relative to the rest position, wherein the stem-crown can adjust, by rotating, the time indication provided by the two hands 10, 11. The unstable position is achieved by pressure on the crown in the direction of case 2 of the watch, a spring (not shown) being provided for returning to its rest position when the pressure stops, like a push-button. Each application of pressure on stem-crown 7 operates the watch in order to alter the current display and to display information, the nature of which depends on the state of watch 1 at the moment pressure is applied.

Conventional means are provided for an automatic change of operating mode, in particular for passing from the time mode to a second operating mode, called the dive mode, at the start of a dive. These means also allow a return to time mode, automatically, from the dive mode when the drive, who is wearing the watch, resurfaces. For this purpose, one could for example use two ohmic contacts (not shown) each of which has a part located outside case 2 of watch 1, with this external part thus coming into contact with the water during a dive. These two contacts thus form a switch, open when watch 1 is outside the water and closed when it is immersed in water. Closing this switch automatically activates passage into dive mode.

Of course, as was mentioned hereinbefore, it is possible to provide manual means for activating the dive mode in addition or as an alternative to the automatic activation described hereinbefore. In particular, an additional control member could be provided to fulfil this function.

Since these means form part of the state of the art, they will not be described further in this patent application, insofar as they do not constitute the core of the present invention and those skilled in the art will not encounter any particular difficulty in implementing them.

Once the dive mode has been activated, the functions respectively associated with hour hand 10 and minute hand 11 are the instantaneous depth display and the display of time elapsed since the start of the current dive.

Thus, when the diver enters the water, which activates the dive mode, the two hands 10 and 11 are respectively positioned facing the 35 minute indication carried by bezel 6 and, at twelve o'clock, in other words opposite the 60 minute indication. When the diver descends, hour hand 10 starts to rotate clockwise to indicate the instantaneous depth value opposite second graduations 8 and 9. At the same time, minute hand 11 starts to rotate at constant speed, opposite the first graduations carried by bezel 6, to indicate the time elapsed since the start of the dive.

It should be noted that the legibility of the depth indication is intuitive due to the proximity of the end of hour hand 10 to the second graduations on the dial. Moreover, since the colours of minute hand 11 and bezel 6 are identical, this facilitates an intuitive association of the hand with the corresponding graduations.

The excellent legibility of dive watch 1 according to the invention will be noted, since the display is sober and merely employs a structure proven for several centuries, namely an analogue display system, preferably using hands, although the use of rotating discs carrying indices could be envisaged. Thus, when he consults his watch, the diver needs very little time to determine the situation he is in as regards the current dive. Indeed, reading of the time elapsed in minutes is intuitive since it is similar to reading of the minutes in time mode.

Additional functions are also provided in dive watch 1 and they are accessible via stem-crown 7. The nature of the accessible functions, apart from the historic mode, and the way in which it is accessed, are given by way of non-limiting examples.

Means can be provided for controlling the hour and minute hands 10 and 11 in response to pressure on stem-crown 7 from the drive mode, such that they respectively display the maximum depth reached during the current dive and the dive time elapsed. An automatic return to dive mode after a time interval of several seconds could then be provided. The return to dive mode could also be obtained by another application of pressure on stem-crown 7.

Moreover, additional means are provided for controlling the hour and minute hands 10 and 11 in response to an application of pressure on stem-crown 7 from the time mode, such that they respectively display the maximum depth reached during the last dive made and the total time thereof. An automatic return to time mode can then be provided or obtained by another application of pressure on stem-crown 7. Likewise, the electronic circuit of watch 1 could include a sufficient number of memory zones to store the parameters, namely the total duration and maximum depth, of the last five dives, for example. In such case, a long application of pressure on stem-crown 7 from the time mode could cause passage to the mode displaying the parameters of the last dives, the choice of dive being made by successive short applications of pressure on stem-crown 7 and, the return to time mode preferably being automatic or obtained by another long application of pressure on stem-crown 7. In this latter case, means could also be provided for controlling hands 10 and 11 so that they are superposed opposite second graduations 8 for a predefined period of time, of the order of several seconds, so as to indicate the number of the dive whose parameters are being displayed automatically after the predefined time period.

According to the present invention, dive watch 1 includes a third operating mode, called the historic mode, activated by further action on stem-crown 7. The watch can be programmed in any way such that this activation occurs in response to another long application pressure from the last dive parameter display mode, or in response to a double application of pressure from the time mode, for example. Typically, the watch automatically returns to time mode after the end of the history display. However, manual action on stem-crown 7 could of course be provided, in a complementary manner, to force a return to time mode before the end of the history.

In order to implement the historic mode, means are provided for controlling hour and minute hands 10 and 11 such that they reproduce the behaviour that they respectively had during the previously selected dive.

Several alternative implementations of the historic mode could be provided. Since a dive can last several tens of minutes, it is preferable to control hands 10 and 11 such that they reproduce their respective behaviour with an accelerated speed compared to the measurement acquisition speed. Those skilled in the art can define the acceleration parameters suited to their needs and programme the electronic circuit of the watch accordingly, without departing from the scope of the present invention. One could provide, for example, a division by 60 of the total dive time to be displayed, such that ten minutes of diving are reproduced in ten seconds in the historic mode.

A preferred alternative implementation of the historic mode from the point of view of speed of reproduction consists in reproducing the entire dive, whatever its length, in a time window predefined by the watch manufacturer. The time window can be defined with a fixed length or variable length, comprised between two extreme values. By way of example, the length of the history could be fixed at 30 seconds, the movement of hands 10 and 11 then being adapted to reduce the actual length of the dive to 30 seconds. One could also provide, alternatively, that the history length is comprised between 15 and 30 seconds particularly as a function of the actual length of the dive being reproduced.

In the case of a device made in the form of a dive watch, a type of sporting activity that differs from scuba diving should also be provided, namely snorkel diving. The mean duration of a snorkel dive is of the order of several minutes and thus considerably less than the mean duration of a scuba dive. Consequently, the method used for accelerating the history display in relation to the actual dive, as described hereinbefore, is not necessarily suited to the application of the history mode to a series of pressure measurements for a snorkel dive.

Consequently, it can be useful, according to a preferred variant of the dive watch according to the invention to provide a specific processing of the measurement series made during the snorkel dives.

One criterion can be defined as to the duration of a dive to allow the electronic circuits of the watch to distinguish scuba diving from snorkel diving, such as for example defining any dive whose duration is less than 3 minutes as a snorkel dive. In such case, the history of such a dive could be displayed by dividing its actual length by six. Thus, the longest snorkel dive according to the criterion used above by way of example, i.e. 3 minutes, is reproduced in 30 seconds in the historic mode. Of course, the previously described method could also be used, consisting in using a time window comprised between 15 and 30 seconds the factor connecting the duration of the actual dive and the dive in historic mode having a certain value dependent upon the actual length of the dive.

When the pressure sensor is powered to take one measurement per second, each measurement is preferably stored in a specific memory zone at least for the first three minutes. If the dive is a snorkel dive whose length his less than three minutes, a sufficient number of measurements is therefore stored to the dive history to be reliably reproduced.

When the dive lasts more than three minutes, the measurements are advantageously stored in the memory at a lower frequency than the pressure sensor measurement frequency. This arrangement limits the size of the memory zone necessary when the dive length becomes more important, without however, being detrimental to the history reproduction quality. In a preferred manner, a pressure value, or depth value is stored with a period of the order of several tens of seconds for scuba diving, for example every 30 seconds. Moreover, when the current dive length reaches 3 minutes, in accordance with the example provided above, a large part of the stored measurements is deleted so as to free memory space for the subsequent measurements. In fact, only measurements taken at time intervals whose length corresponds to the period provided for storing scuba diving measurements need to be kept, i.e. 30 seconds according to the aforementioned example.

Taking the preceding numerical example, given by way of non-limiting illustration, storage of the first three minute of a dive requires 180 memory spaces, this number then being reduced to 6 when the dive length passes 3 minutes. Moreover, when the dive is extended, because of the lower storage frequency, it becomes possible to store the profile of the dive for a maximum period of one and a half hours with this number of memory spaces, which is enough to answer the requirements of most divers.

According to a preferred alternative of the electronic device memory control, a more progressive storage frequency variation could be provided for the measurement results. By way of illustration, for a dive length comprised between 0 and 2 minutes, one measurement result in two is stored, in other words the memory device stores one value every two seconds when the measurement frequency is 1 Hz. In such case, at least 60 memory spaces have to be provided to store these values. When the dive length reaches 2 minutes, the device controller circuit is then preferably programmed such that one in two previously stored values are deleted, the values remaining in the memory are then shifted to be stored in successive spaces. At the same time, the storage frequency is adapted to this new situation by being divided by two, i.e. one measurement is stored every 4 seconds. When the dive length reaches 4 minutes, all the memory spaces are again occupied. The controller circuit is then arranged to repeat the previously described operation, namely freeing one memory space in two, shifting the remaining values and again altering the storage frequency of the new measurements. When the dive length has a large value, it is possible for this process to be repeated as many times as necessary. Alternatively, beyond a certain length, like for example 15 minutes, the measurement storage frequency could be divided by a higher factor than two, such that the number of memory spaces is sufficient to store the measured values for a dive whose length reaches a predefined value, which could be of the order of 1 hour and thirty minutes, for example.

Of course, different lengths of time could be provided for altering the storage frequency, and different values for the frequency division factor without departing from the scope of the present invention.

This memory management method guarantees optimum time resolution of the display of values measured during diving when the watch operates in historic mode.

The historic mode has a major advantage as regards safety, since it displays the profile of the selected dive quickly, which is very important information for a doctor called following a dive accident. Usually, a doctor can see the dive profile by transferring data from a dive computer onto a read and exploitation terminal, possibly of the personal computer type. The historic mode according to the present invention provides an advantage over devices of the state of the art in terms of speed of access to such data. Moreover, the advantages explained hereinbefore, concerning the legibility of the dive watch 1 also apply to the use of the historic mode. It is quite easy to visualize the selected dive profile by observing the movement of hands 10 and 11.

Figure 2:
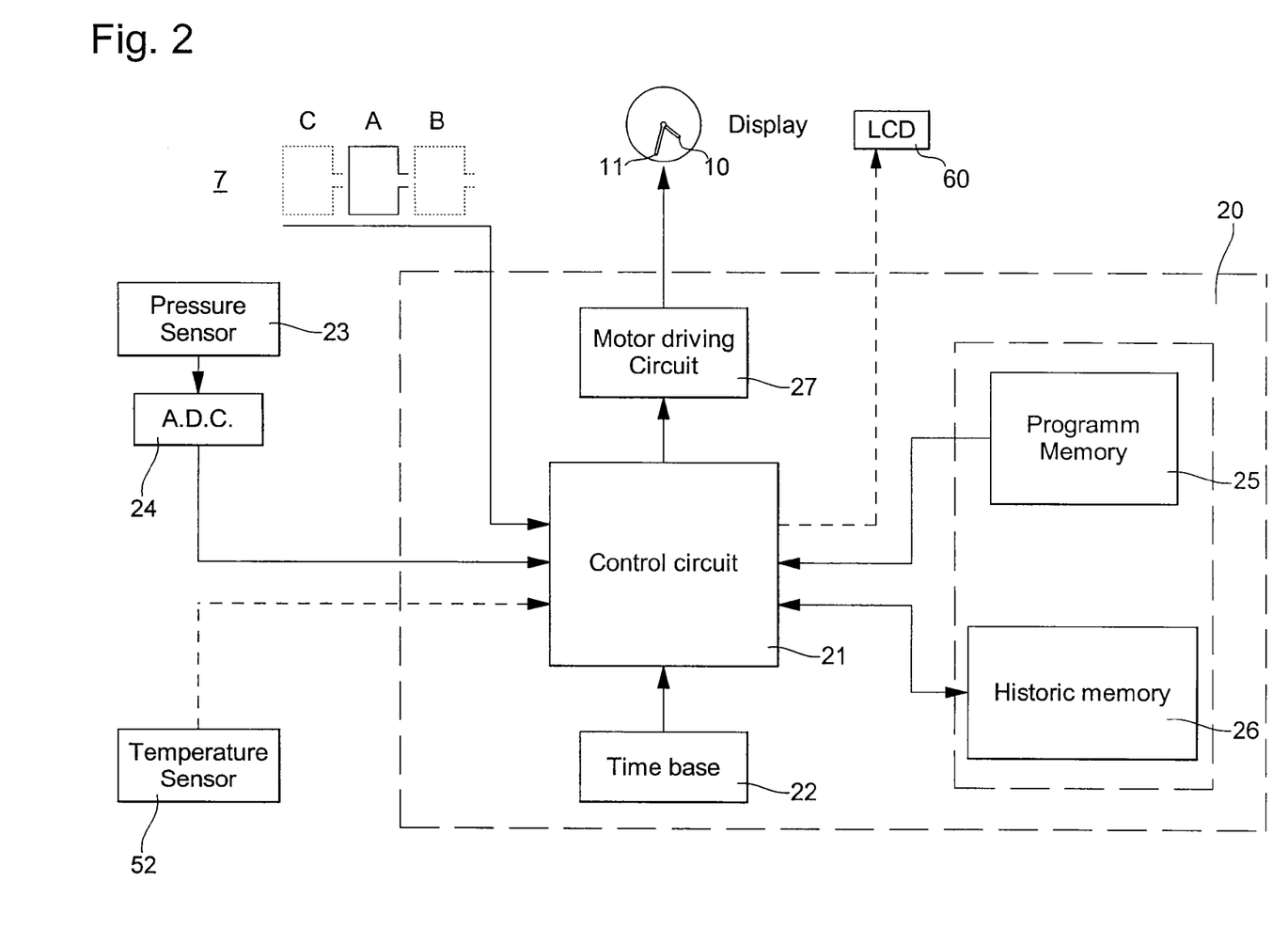
FIG. 2 shows a general schematic diagram of the electronic circuit of the indicator device shown in FIG. 1.

FIG. 2 is a schematic diagram of the general structure of the electronic circuit of the dive watch according to the present invention.

Generally, the electronic circuit of the watch includes in particular an integrated circuit 20 including a controller circuit 21 able to manage the conventional time functions of watch 1 including, for this purpose, a time division circuit and connected in particular to a resonator 22 supplying a time base. From this time base, controller circuit 21 produces time data, particularly for performing the time mode functions and dive mode related functions.

Moreover, controller circuit 21 receives input signals generated by a pressure sensor 23 generating analogue electric signals representative of the surrounding pressure. These signals pass through an analogue-digital converter 24 prior to be supplied to the input of controller circuit 21 in the form of digital signals.

Pressure sensor 23 is of a conventional type and those skilled in the art will not have any particular difficulty in selecting one suited for implementing the present invention.

Integrated circuit 20 also includes memory zones, particular a first memory zone 25, preferably of the non-volatile type, containing a program allowing controller circuit 21 to perform calculations relating to the dive mode, like for example the conversion of pressure measurements into depth values. The choice of a reprogrammable non-volatile memory (Flash or EPROM, for example) enables the calculation program to be updated subsequently. Integrated circuit 20 includes in a preferred manner at least a second memory zone 26, also of the non-volatile type, in which the measurements and the results of the calculations made by controller circuit 21 are periodically stored. This second memory zone 26 is provided for storing depth measurements and the corresponding time measurements relating to the last dive or dives. Thus, controller circuit 21 consults this data, in particular when the watch is in the historic mode.

From these respective input signals, controller circuit 21 determines the diver's situation at each moment of a dive. Controller circuit 21 then sends suitable signals to a control circuit 27 of two-directional motor means, such that hour hand 10 displays the instantaneous depth opposite second graduations 8 and 9 of the dial. Likewise, controller circuit 21 produces suitable signals for control circuit 27 of the motor means, for example two two-directional motors, such that minute hand 11 displays the time that has elapsed since the start of the dive, opposite graduations carried by bezel 6 of the watch.

An additional advantage of the dive watch according to the invention lies in its aesthetic appearance. Indeed, because of its discreet presentation, which is not generally the case of conventional dive computers, this watch can be worn in any circumstances and thus permanently. Thus, its user is not obliged to anticipate a future dive to wear his watch in that he can wear it permanently without making any kind of aesthetical concessions.

Moreover, the electronic circuit of the watch includes conventional means (not shown) for detecting applications of pressure by the user on the stem-crown 7. The latter is in position A at rest and has two end positions B and C. Position B, which is unstable and obtained by an application of pressure by the user, activates a function of controller circuit 21 altering the operating mode of the watch, as described hereinbefore. When stem-crown 7 is pushed into position B from the time mode, controller circuit 21 generates signals, to motor control circuit 27, such that hour and minute hands 10 and 11 respectively display the maximum depth and the total length of the last dive. Moreover, in accordance with the foregoing, the historic mode can be activated by a long application of pressure on position B of stem-crown 7, from the mode displaying the parameters of the last dive, or by a double application of pressure from the time mode. Further, when stem-crown 7 is pushed into position B from the dive mode, controller circuit 21 generates signals, to motor control circuit 27, such that the hour and minute hands 10 and 11 respectively display the maximum depth reached and the time elapsed from the start of the current dive.

Of course, those skilled in the art are capable of programming integrated circuit 20 of the watch according to the present invention as they wish, to provide responses that are respectively suited to the various actions possible on stem-crown 7.

Moreover, conventional means that are well known to those skilled in the art are implemented for correcting the current time indicated by hands 10 and 11, in the time mode, when stem-crown 7 is pulled out in stable position C.

Figure 3A:
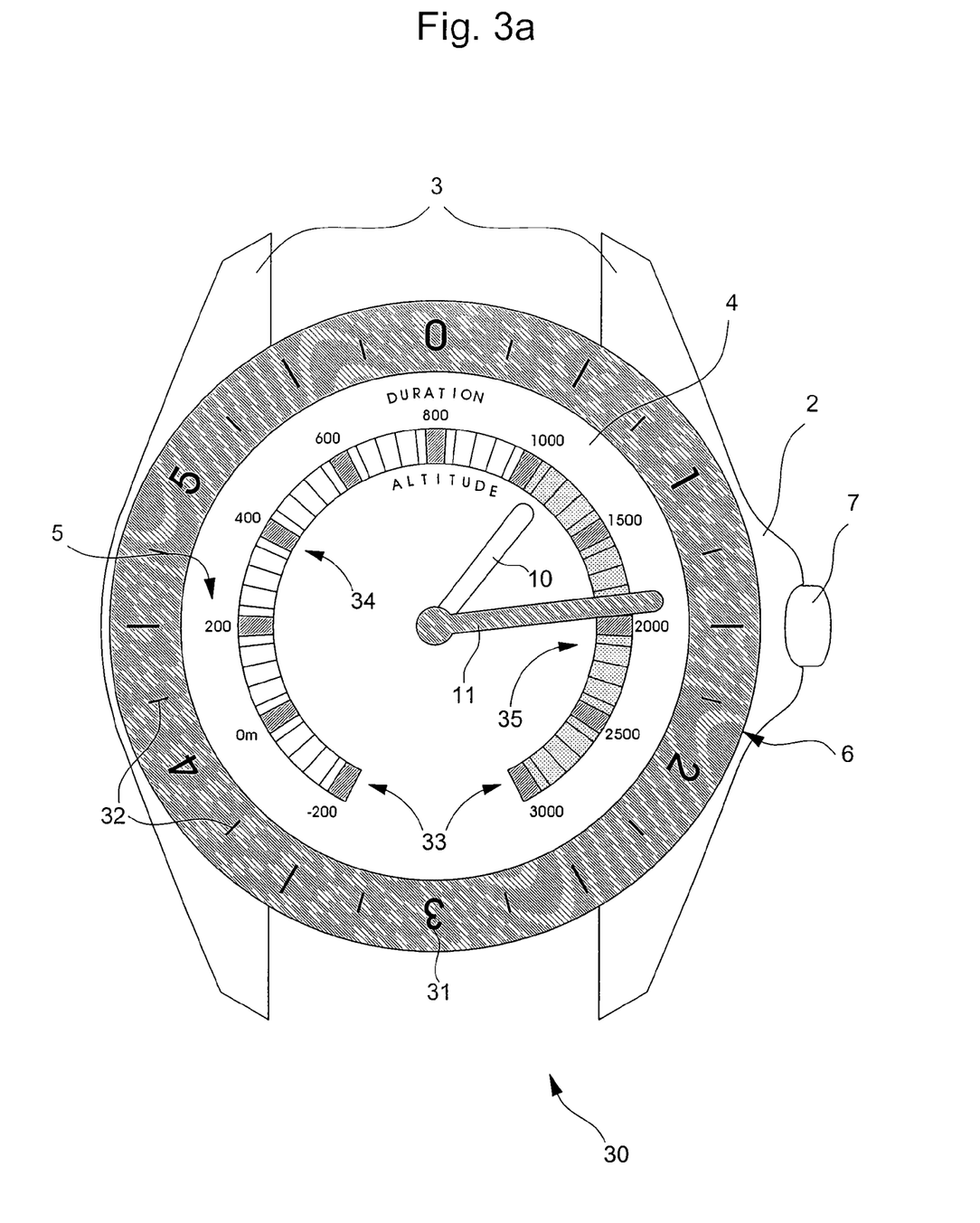
FIG. 3a shows a similar front view to that of FIG. 1 of a portable electronic device according to a second embodiment of the present invention.

FIG. 3a shows a portable electronic device according to a second embodiment of the present invention, in a similar view to the view of FIG. 1. The principle governing the operation of the device according to this embodiment is similar to the principle described in relation to FIGS. 1 and 2. Thus, most of the elements described in relation to FIG. 1 are used again in FIG. 3a and bear the same reference numerals for the sake of simplification.

The electronic device of FIG. 3a is a watch 30 having an altimeter function. Consequently, watch 30 includes time indicating means, in a time operating mode, similar to those described in relation to the first embodiment, particularly hour hand 10 and minute hand 11.

The fixed bezel 6 bears first graduations 31 whose unit is the hour and which are spaced such that one complete turn of the bezel corresponds to a period of six hours. Additional indices 32 are provided for marking each quarter of an hour.

Dial 4 bears second graduations 33, whose unit is the meter, distributed along two contiguous zones. The first zone 34 extends over a half-turn of the dial and bears graduations comprised between −200 meters and 1,000 meters. The second zone 35 is located in the extension of the first zone, extends over one third of a turn of the dial and bears graduations comprised between 1,000 and 3,000 meters, the pitch of which is smaller than that of a the graduations of the first zone.

As in the first embodiment, it should be noted that minute hand 11 is preferably the same colour as fixed bezel 6 in order to improve the legibility of watch 30.

Watch 30 is further provided with a pressure sensor (not shown), capable, in a second altimeter operating mode, of measuring the value of the surrounding pressure and generating an electric signal to be sent to the electronic circuits, possibly made in the form of an integrated circuit similar to the integrated circuit 20 of FIG. 2.

In a preferred manner, the user of watch 30 manually activates the altimeter mode, via action on stem-crown 7, detected by integrated circuit 20. Two different functions relating to an altitude indication could be provided.

A first "simple altitude" function consists in indicating the altitude at a given instant in response, for example, to a short application of pressure on stem-crown 7. In this case, the pressure sensor takes one measurement or a finite series of measurements the results of which are transmitted to integrated circuit 20 to be converted into altitude. Integrated circuit 20 then produces electrical signals to be sent to motor control circuit 27, such that hour hand 10 indicates the calculated altitude opposite second graduations 33 of the dial. In order to facilitate reading, minute hand 11 is preferably operated such that it remains superposed on hour hand 10 when watch 30 is in the simple altimeter function. Advantageously, the watch automatically returns to time mode after several seconds, the pressure sensor power supply being interrupted to limit its electrical power consumption.

A second "hike altimeter" function consists in indicating altitude in particular over a prolonged period corresponding to a hike or a cycle ride. The user could for example activate this second function by pressing on stem-crown 7 for several seconds. When integrated circuit 20 detects the signal activating the hike altimeter function, it powers the pressure sensor and produces a control signal to cause hour and minute hands 10 and 11 to move. The hour and minute hands are moved, from the time display, to be positioned respectively opposite the altitude calculated from the surrounding pressure measurement and opposite the first graduation "0" carried by fixed bezel 6.

The pressure sensor is then powered to take periodic measurements of the surrounding pressure, these pressure measurements being converted into altitude to be displayed by hour hand 10 opposite second graduations 33. The sensor is powered periodically, preferably every five or ten seconds.

At the same time, minute hand 11 is made to rotate in the clockwise direction, at a speed such that it completes one full turn of the dial in six hours, to indicate the time elapsed from the start of the hike. If a hike lasts more than six hours, the minute hand continues its movement of rotation and starts a new turn of the dial for as long as the hike altimeter function remains active.

In accordance with the present invention, when the hike altimeter function is activated, the pressure sensor measurement results are stored in the memory by means of similar storage means to those described in relation to the first embodiment.

Those skilled in the art will not encounter any particular difficulty in selecting a period separating two pressure sensor measurements that provides a good compromise, for their requirements, between the electrical power consumption of the sensor and the memory size necessary for storing the measurement results when the hike is of significant length. By way of illustration, only one value in two or three measurements by the pressure sensor could be stored in the memory in order to be edited subsequently in the historic mode.

The historic mode implemented in the device according to the present invention is similar to that described in relation to the first embodiment. It is preferably activated by a predefined action on stem-crown 7, from the time mode. Following detection of the suitable action on the stem-crown, integrated circuit 20 operates hour and minute hands 10 and 11 such that they reproduce the profile of the last hike, i.e. the altitude as a function of time, corresponding to the measurements stored in the storage means of the watch.

As in the first embodiment, a plurality of memory zones can be provided, each capable of storing the values corresponding to a particular hike. Sequences of suitable actions on stem-crown 7 are the provided to enable the user to select the data relating to one hike rather than another.

Moreover, different parameters can also be provided for the speed of the last hike history display without departing from the scope of the present invention. By way of illustration, two different history display durations can be provided depending upon the length of the stored hike, such as a duration of 30 seconds for displaying the history of a hike that lasted up to three hours and a duration of 1 minute for displaying the history of a hike that lasted more than three hours.

Thus, in the historic mode, minute hand 11 is made to indicate, at a given moment, the value of the elapsed time since the start of the hike, whereas hour hand 10 indicates the corresponding altitude value, calculated from the pressure sensor measurement.

The means for activating and deactivating the historic mode, like the means for implementing the same, will not be described in more detail here since they may be similar to the means described in relation to the first embodiment.

It should be noted that the concept of the historic mode as described in relation to the first and second embodiments of the present invention is the same. Indeed, in these two embodiments, the historic mode consists in displaying at least the value of a magnitude linked to the value of a magnitude measured by a sensor, as a function of time. The display of this value is achieved by a first analogue display member, normally used for displaying the current time. Several alternative embodiments can be provided, without departing from the scope of the present invention, as regards the behaviour of the second analogue display member in the historic mode. Indeed, as mentioned hereinbefore, the second display member could remain immobile in a predefined position, or be superposed on the first display member, or it could indicate, at a given moment during the historical reproduction, the time elapsed from the start of the measurements up to that moment.

Figure 3B:
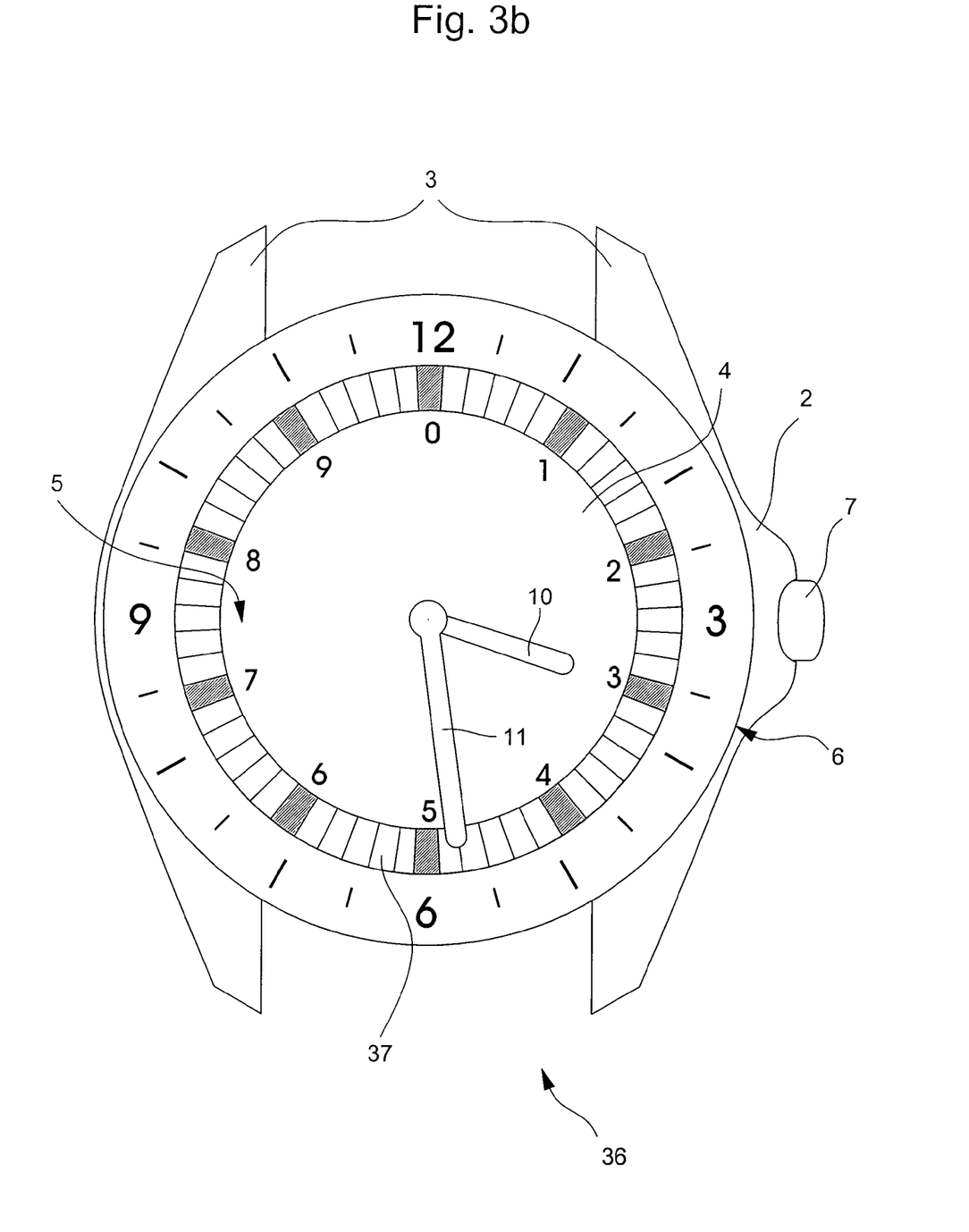
FIG. 3b shows a similar front view to that of FIG. 3a of a portable electronic device according to a variant of the second embodiment.

FIG. 3b shows a variant of the device that has just been described in relation to FIG. 3a, device 36 according to this variant being similar to that of FIG. 3a.

The device according to this variant includes first conventional time indication graduations on fixed bezel 6 and second graduations 37 in meters arranged on the dial and extending over one complete turn. The second graduations include numerical indications 0 to 9, regularly spaced over the periphery of the graduations.

The essential difference distinguishing the device according to this variant from that shown in FIG. 3 lies in the method used for displaying the altitude values and the means employed for the implementation thereof. Indeed, in this variant, the two hour and minute hands 10 and 11 are simultaneously operated to indicate an altitude value. Thus, hour hand 10 is operated to indicate, in relation to second graduations 37, the number of thousands of meters corresponding to the altitude of the person wearing the device at a given moment. Minute hand 11 is operated to complete this information, by indicating, with reference to second graduations 37 read with a factor of $1/10$ in relation to the reading made with hour hand 10, the hundreds and tens of meters corresponding to the altitude of the user.

Thus, by way of illustration, in the configuration shown in FIG. 3b, the device indicates to the user that he is at an altitude of 3480 meters, the three thousand meters being indicated by the hour hand 10 and the remaining 480 meters being indicated by minute hand 11.

As for the variant described in relation to FIG. 3a, two altimeter operating modes can be provided: a "simple" and a "hiking" mode, with the measurements made during operation of the device in the "hiking altimeter" mode being stored in the memory.

A historic mode is provided, in a similar manner to the foregoing description, wherein hour and minute hands 10 and 11 are operated by the electronic circuits of the watch to reproduce the behaviour they exhibited during operation in "hiking altimeter" mode, at an accelerated speed.

Unlike the variant described in relation to FIG. 3a, the elapsed time from the start of a hike is not displayed since both hands 10 and 11 are used simultaneously to display an altitude value. By way of counterpart, in response to a predefined sequence of actions on stem-crown 7, hour and minute hands 10 and 11 could display the value of the total elapsed time during operation in "hiking altimeter" mode.

One advantage of the present variant with respect to that described in relation to FIG. 3a is improved legibility, in particular for altitude values higher than 1,000 meters.

The device according to the variant of FIG. 3b will not be described in more detail here since those skilled in the art will not encounter any particular difficulty in implementing said device.

Figure 4:
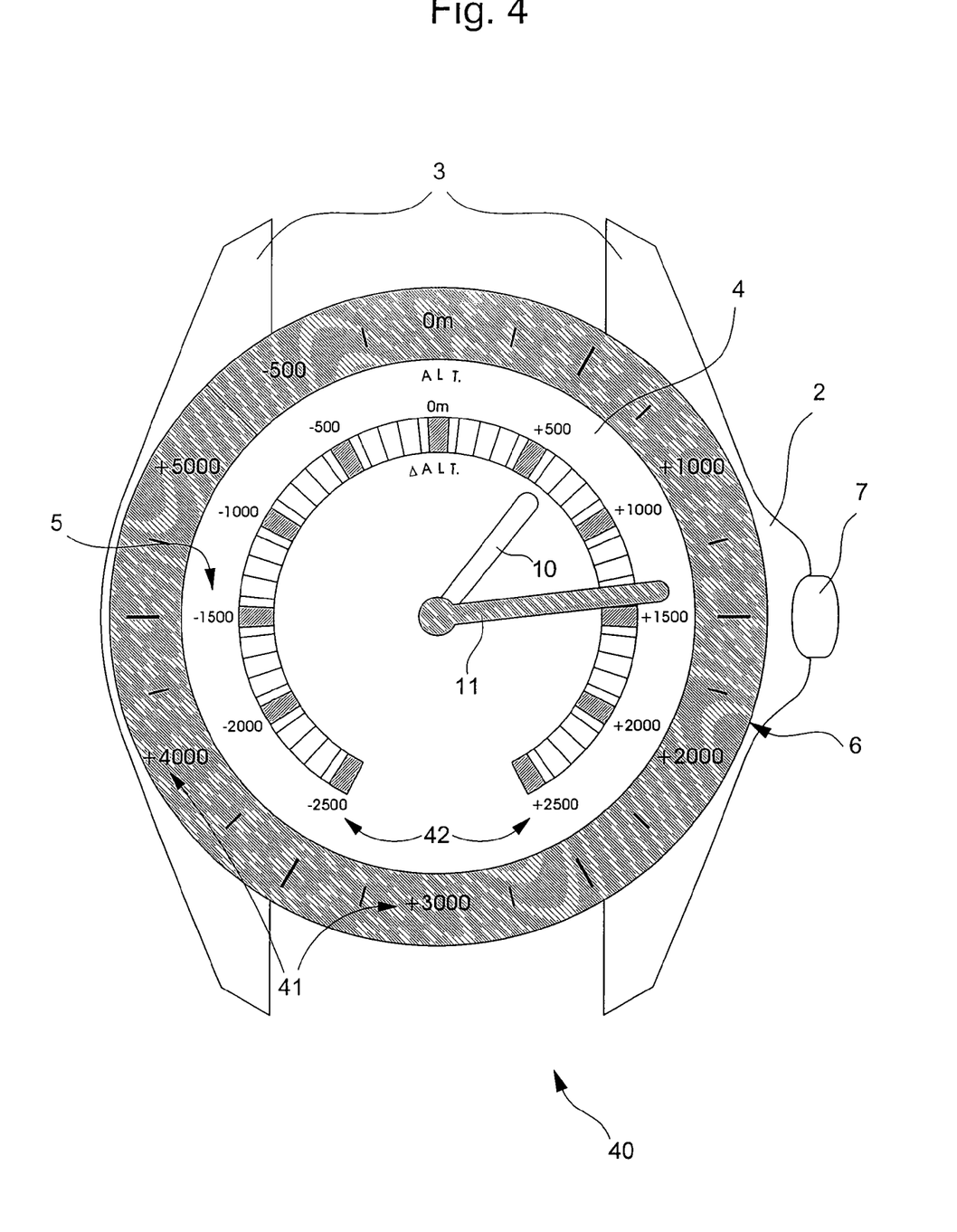
FIG. 4 shows a similar front view to that of FIG. 1 of a portable electronic device according to a third embodiment of the present invention.

FIG. 4 shows a portable electronic device according to a third embodiment of the present invention, in a similar view to that of FIG. 1. This embodiment rests on a slightly different principle to that described hereinbefore. Indeed, the electronic device is provided here with at least one sensor for a physical magnitude and the respective values of two different variables are deduced from the sensor measurements. Preferably, the portable electronic device is a watch including a first time operating mode with an analogue type display, a second operating mode for acquiring measurements from the sensor and, a third operating mode called the historic mode.

Watch 40, shown in FIG. 4, is of similar shape to that of the watches of FIGS. 1 and 3, as are the electronic circuits operating the same. Those elements similar to the elements already described in relation to FIGS. 1 and 3 bear the same reference numerals and will not be described further in relation to FIG. 4.

The watch 40 illustrated is also of the type with a pressure sensor and it includes an altimeter function, like the watch described in relation to FIG. 3. First graduations 41 in meters are arranged on fixed bezel 6 of watch 40 and are used in relation to minute hand 11 for indicating an altitude, in an altimeter operating mode of watch 40. For this purpose, graduations 41 extend over one complete turn of fixed bezel 6, from a position located substantially halfway between the time positions corresponding to 10 o'clock and 11 o'clock. The corresponding range of values of graduations 42 extends substantially from −750 meters to +5250 meters, such that the graduation corresponding to sea level altitude, is arranged at 12 o'clock. In a preferred but non-limiting manner, a similar colour can be used for fixed bezel 6 and minute hand 11 to improve the legibility of the altitude display.

Second graduations 42, also in meters, are shown on dial 4 and are used in relation to hour hand 10 to indicate the value of an altitude variation or change in level. The graduation corresponding to zero level change is arranged at 12 o'clock, whereas graduations 42 extends symmetrically, on the one hand between the 12 o'clock position and the 5 o'clock position to indicate the value of a positive level change and, on the other hand, between the 12 o'clock position and the 7 o'clock position to indicate the value of a negative level change. In particular, by way of illustration, the values of second graduations 42 are substantially comprised between −2500 and +2500 meters.

Watch 40 includes, in addition to a first time operating mode, a second altimeter operating mode and a third mode called the historic mode.

Like watches 30 and 36, respectively described in relation to FIGS. 3a and 3b, watch 40 can include two altimeter functions, a "simple" and a "hiking" altimeter function.

Preferably, but in a non-limiting manner, the two hands 10 and 11 are superposed when the "simple altimeter" function is activated to indicate the altitude value, at a given moment, calculated on the basis of at least one measurement made by the pressure sensor. After several seconds of instantaneous altitude display, watch 40 automatically returns to time mode, the hour and minute hands returning to their first function of indicating the current time.

As mentioned in relation to the preceding embodiment, by way of example, a double short application of pressure or a long application of pressure on stem-crown 7 activates the "hiking altimeter" function. In this second operating mode, the pressure sensor is periodically powered to take measurements of the surrounding atmospheric pressure and store them in a suitable memory zone, for the purpose of subsequently displaying the profile of the corresponding hike during execution of the historic mode.

In accordance with this embodiment, integrated circuit 20 of watch 40 executes a preliminary step of storing an initial pressure value on the basis of one of the first measurements taken by the pressure sensor. The initial pressure value therefore corresponds to the altitude at which the user is situated at the start of the acquisition mode, i.e. typically when the user starts a hike.

Integrated circuit 20 processes the results of the measurements subsequently taken by the pressure sensor, to associate an altitude value and an altitude difference value with each measured pressure value, the altitude difference value being calculated in a conventional manner from the initial pressure value stored in the memory. Preferably, the calculated values are displayed on watch 40 during the acquisition mode, the altitude being indicated by minute hand 11 and the altitude difference by hour hand 10. In a non-limiting manner, a short application of pressure made on stem-crown 7 during the acquisition mode could make the watch pass to a time display for several seconds before returning to a display of the calculated values.

Watch 40 could also continue to display the current time during the entire acquisition mode without departing from the scope of the present invention, the calculated values then being displayed in the historic mode as explained hereinafter. In this case, watch 40 could also display the altitude and altitude difference traveled since the start of a hike for several seconds in response to action on stem-crown 7.

Further, the values measured by the pressure sensor are stored during the course of the acquisition mode, either directly in the form of pressure values, or after processing in the form of altitude values. This latter alternative is however preferred since processing of the pressure values must occur first at the moment they are displayed in the form of altitude values during the acquisition mode. Thus, when the values are stored in the form of altitude values, the processing step is no longer necessary during display of the profile of a hike whose data has been stored, in the historic mode.

As for the preceding embodiment, those skilled in the art can choose to use a storage frequency that is equal to or less than the frequency at which the measurements are taken by the pressure sensor.

As regards the altitude difference values, they can be stored directly after they have been calculated during the course of the acquisition mode in order to be displayed. Thus, simply reading the content of the memory is sufficient to allow a subsequent display of the profile of the stored hike during execution of the historic mode.

However, those skilled in the art could decide not to store the altitude difference values calculated during acquisition mode, but to calculate them again during execution of the historic mode, without departing from the scope of the present invention. This latter solution has the advantage, with respect to the preceding solution, of requiring a memory zone of smaller size, which might be an essential criterion in the manufacture of the corresponding watch.

Once the hike is finished, the person wearing watch 40 can deactivate the acquisition mode by a predefined action on the stem-crown 7 to return to time mode and interrupt the power supply to the pressure sensor.

The historic mode implemented in the device according to the present embodiment is similar to that described in relation to the first embodiments. It is preferably activated by action on stem-crown 7 from the time mode. Following detection of the appropriate action on the stem-crown, integrated circuit 20 controls hour hand 10 and minute hand 11 such that they display the profile of the last hike.

Thus, in the historic mode according to the present invention, minute hand 11 is controlled at an accelerated speed to indicate, at a given instant, the corresponding altitude value during the course of the hike, whereas hour hand 10 indicates the corresponding altitude difference value with respect to the altitude at the start of the hike, these values being calculated from the pressure sensor measurement.

As in the first two embodiments, a plurality of memory zones can be provided, each being capable of storing the values corresponding to a particular hike. Suitable sequences of actions on stem-crown 7 are then provided to enable the user to select the data relating to one hike rather than another.

Moreover, different values can be provided for the speed of the last hike history display without departing from the scope of the present invention.

The historic mode activation and deactivation means, and the means for implementing the same will not be described in more detail here since they may be similar to the means described in relation to the first embodiments.

It is clear that the present invention is not limited to the nature of the displayed information. By way of example, an alternative embodiment (not shown) of the device according to the present invention could be envisaged, on the basis of watch 40 that has just been described, programmed to display, instead of an altitude and altitude difference, an instantaneous speed of the altitude variation and a mean speed of the calculated altitude variation over a sliding period. This type of electronic device proves useful for practicing certain air sports such as paragliding or gliding. This variant has an additional advantage in relation to watch 40, from the point of view of legibility, because the relative position of the hands provides an additional indication, this indication being a qualitative appreciation of the altitude variation acceleration.

Figure 5:
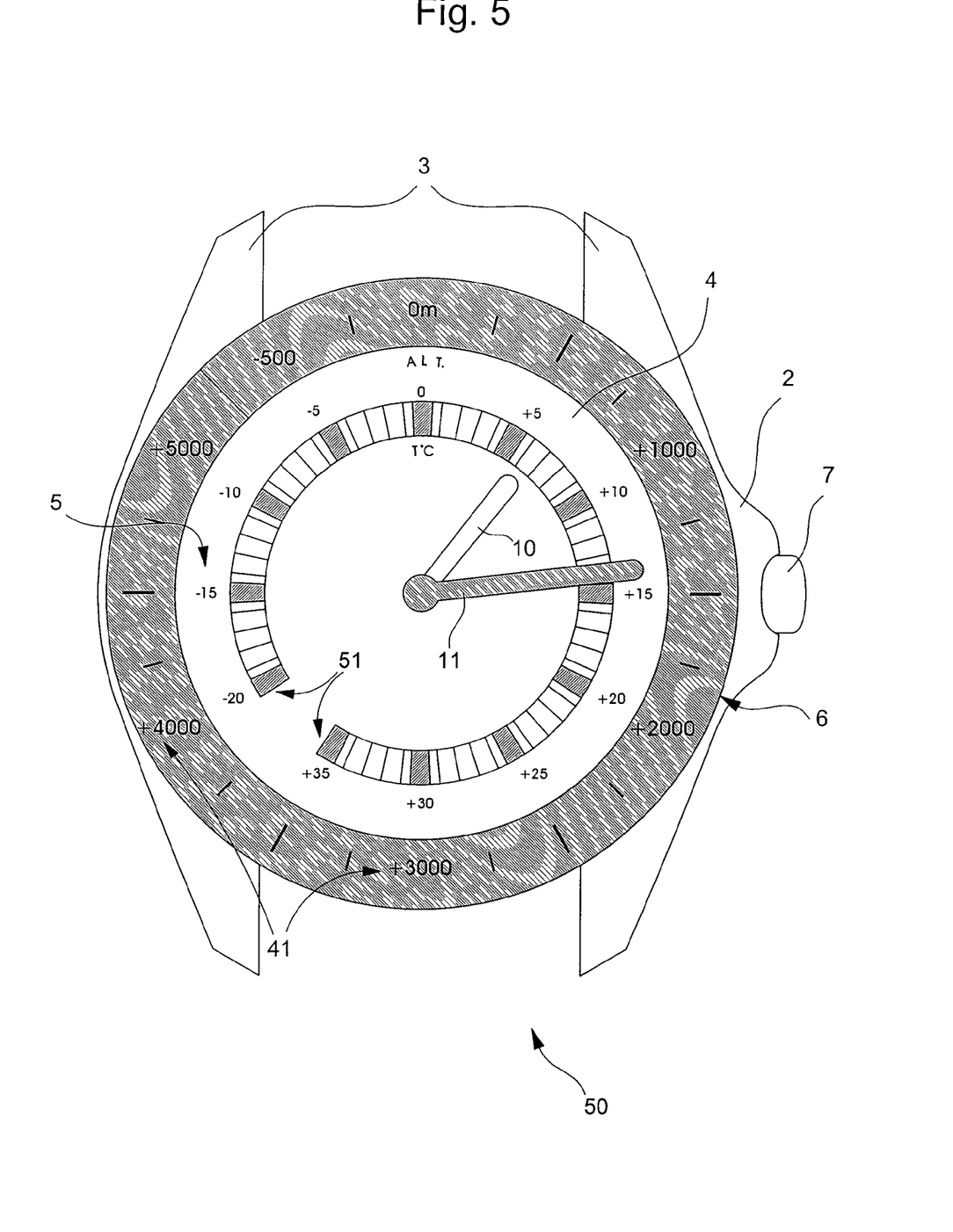
FIG. 5 shows a similar front view to that of FIG. 1 of a portable electronic device according to a fourth embodiment of the present invention.

FIG. 5 shows a portable electronic device according to a fourth embodiment of the present invention, in a similar form to that previously described, i.e. in the form of a watch 50.

In accordance with this embodiment, watch 50 includes two sensors for respectively taking measurements of first and second physical magnitudes. Thus, means are provided for displaying the value of a first variable connected to the first physical magnitude using a first analogue display member and, for displaying the value of a second variable connected to the second physical magnitude using a second analogue display member.

Watch 50, shown and described by way of non-limiting example, is fitted with a pressure sensor of a similar type to the pressure sensor mentioned in relation to the preceding embodiments. Watch 50 is also fitted with a conventional type sensor, whose measurements provide access to temperature values, like for example a thermistor.

Watch 50 further includes the same first graduations 41 in meters as watch 40 described in relation to the third embodiment. Graduations 41 are arranged on fixed bezel 6 for the indication of altitude values in relation to minute hand 11.

Second graduations 51, in degrees Celsius, are arranged on dial 4 for the indication of temperature values in relation to hour hand 10. Second graduations 51 extends, in the clockwise direction, from the 8 o'clock position, corresponding to a temperature of −20° C., to a 7 o'clock position, corresponding to a temperature of +35° C.

Of course, those skilled in the art can alter the temperature indication unit or the temperature display range, to adapt it to their particular requirements, without departing from the scope of the present invention.

As for the preceding embodiments, the user of watch 50 can activate a data acquisition mode connected to his environment via appropriate action on stem-crown 7 from the time operating mode. In acquisition mode, the two pressure and temperature sensors (bearing the respective reference numerals 23 and 52 in FIG. 2) are powered to take periodic measurements respectively of the surrounding pressure and temperature. The measurement results are processed by integrated circuit 20, then stored in the memory in memory zone 26 with a frequency equal to or less than the measurement frequency, as explained hereinbefore.

Those skilled in the art will not encounter any particular difficulty in programming integrated circuit 20, particularly as regards the method of storing the processed values. One could envisage storing the values connected to the pressure measurements and those connected to the temperature values either in independent memory zones or in a single memory zone, without departing from the scope of the present invention.

According to the present invention, watch 50 includes a third operating mode in the form of a historic mode, similar to the historic modes described in relation to the preceding embodiments.

In the historic mode, minute hand 11 is made to reproduce the altitude variations as a function of time in accordance with the stored data. It should be noted that, as for the third embodiment, an item of time data is implicitly contained in the duration necessary to display all of the stored measurements. However, this time information is relative, i.e., for example, an ascent time could be evaluated in relation to a descent time for a hike whose history is being displayed, but the absolute or actual length of the hike is not directly accessible from the history mode as it was described hereinbefore.

Whereas minute hand 11 displays the altitude at a given instant, hour hand 10 is made to display the corresponding temperature, as it was stored during the course of the acquisition mode. Thus, visualization of the history display provides the user of watch 50 with a good appreciation of the change in temperature as a function of altitude during a hike, for example. Indeed, the display means used are extremely easy to read and provide an intuitive approach making the information displayed very clear to the user.

Of course, the presentation of watch 50, as shown and described, is not limiting. One could for example envisage a variant with altitude and/or temperature use ranges different from those mentioned hereinbefore.

The preceding description corresponds to preferred embodiments of the invention and should in no way be considered limiting, as regards more specifically the structure described for the watch and its electronic circuits, the nature and the number of the control members used, the matching colours used or the positioning of the graduations. More particularly, as regards the ergonomics of the display, it will be observed that the association of a given hand with a specific display zone at the time of reading is facilitated when their respective appearance is similar, the identical choice of colour, as described in this application, forming a non-limiting example. One could also provide lighting for the dial, for example. Moreover, the assignment of the various functions to the hour and minute hands is not limiting and their respective roles could be reversed without altering the nature of the present invention.

By way of example, the electronic device could be arranged, without departing from the scope of the present invention, such that one of the two hands is made to display the total altitude difference calculated between the altitude of the starting point and the altitude at a given point, whereas the second hand is made to indicate either the positive cumulated altitude difference or the negative cumulated altitude difference from the starting point. The user would then have the possibility of choosing the cumulated altitude difference best suited to the activity that he wishes to perform. By way of illustration, it is more advantageous to know the value of the negative cumulated altitude difference for downhill skiing and the positive cumulated altitude difference for mountain climbing.

Those skilled in the art will be able to apply the history principle as described hereinbefore to other physical magnitudes than those mentioned by way of illustration without departing from the scope of the present invention, like for example by fitting the electronic device with a magnetic field sensor for indicating magnetic north to the user.

Moreover, a variant could be provided for each of the embodiments described, wherein the watch further includes a region having a liquid crystal display (shown in a diagram in FIG. 2 under the reference numeral 60) without departing from the scope of the present invention. Implementation of such a display completes the information of the hour and minute hands by the simultaneous display of further information. For example, in the first embodiment, the actual length of the dive concerned and/or the maximum depth achieved during the dive could be displayed. Likewise, in the subsequent embodiments, the watch could display information relating to the actual length of a hike, or even the time elapsed since the start of a hike at a given instant, in the third and fourth embodiments.

Additional variants could be envisaged for the previously described embodiments wherein a third hand is implemented, such as for example, a center seconds hand.

By way of illustration, on the basis of the third embodiment, in the "hiking altimeter" mode, and in the historic mode, the third seconds hand could be made to indicate an altitude value, whereas the hour and minute hand are made to indicate respectively a positive cumulated altitude difference and a negative cumulated altitude difference, the two altitude difference values being calculated from the altitude of the starting point.

Of course, it is possible to envisage fitting the electronic device according to the invention with additional means for transferring data to a personal computer type of computer, via a wired or wireless connection, in a known manner.

Moreover, one could envisage fitting the electronic device with a barometer function, the indications of which would be derived from the measured pressure values, display by the analogue display members of a history of the development of barometric trends over time then being possible.

Likewise, the invention is not limited to possible passages from one mode to another as described, since these parameters can be altered by appropriate programming of the controller circuit. Those skilled in the art will not encounter any particular difficulty in adapting the operation of the watch according to the present invention to their particular requirements.

The invention claimed is:

1. A watch including:
   (a) a case containing a watch movement on which a dial is mounted, the watch movement including electronic circuits able to generate time signals to be sent to motor means controlling at least first and second analogue display members, wherein the analogue display members are arranged above the dial to display current time in a time mode that is a first operating mode;
   (b) a sensor for a physical magnitude, for periodic acquisition of value of the physical magnitude as a function of time in a second operating mode, wherein said sensor is an ambient pressure sensor; and (c) means for automatically activating said second operating mode from said time mode in response to immersion of the watch in water, wherein the sensor is connected to means for processing values capable of generating electric signals to storage means provided for storing values, wherein the watch has a historic mode that is a third operating mode in which the processing means are arranged for generating control signals to be sent to the motor means for a display representative of stored values of the physical magnitude as a function of time so that at least said first analogue display member indicates, opposite suitable graduations of the watch, the value of a variable, the change in which is linked to physical magnitude value on condition that the variable does not give any indication relating to time remaining before a decompression stop has to be made or any indication relating to a minimum depth not to be exceeded by a person wearing the watch when coming up from a dive when said second analogue display member is made to indicate information relating to a depth and said first analogue display member indicates a measured depth.

2. A watch including:

(a) a case containing a watch movement on which a dial is mounted, the watch movement including electronic circuits able to generate time signals to be sent to motor means controlling at least first and second analogue display members, wherein the analogue display members are arranged above the dial to display current time in a time mode that is a first operating mode;

(b) a sensor for a physical magnitude, for periodic acquisition of value of the physical magnitude as a function of time in a second operating mode, wherein the sensor is connected to means for processing values capable of generating electric signals to storage means provided for storing values, wherein the watch has a historic mode that is a third operating mode in which the processing means are arranged for generating control signals to be sent to the motor means for a display representative of stored values of the physical magnitude as a function of time so that at least said first analogue display member indicates, opposite suitable graduations of the watch, the value of a variable, the change in which is linked to physical magnitude value on condition that the variable does not give any indication relating to time remaining before a decompression stop has to be made or any indication relating to a minimum depth not to be exceeded by a person wearing the watch when coming up from a dive when said second analogue display member is made to indicate information relating to a depth, and wherein in said historic mode, said electronic circuits are capable of operating said motor means so that the display of the value of said variable as a function of time is performed over a predefined maximum period of time, so that when actual duration of said acquisition of the value of the physical magnitude is greater than said predefined period of time, the value of said variable as a function of time is displayed in an accelerated manner.

* * * * *